(12) United States Patent
Boissière et al.

(10) Patent No.: US 12,340,031 B2
(45) Date of Patent: Jun. 24, 2025

(54) MUTING MODE FOR A VIRTUAL OBJECT REPRESENTING ONE OR MORE PHYSICAL ELEMENTS

(71) Applicant: Apple Inc., Cupertino, CA (US)

(72) Inventors: Clément Pierre Nicolas Boissière, San Francisco, CA (US); Shaun Budhram, Los Gatos, CA (US); Tucker Bull Morgan, Sunnyvale, CA (US); Bruno M. Sommer, Sunnyvale, CA (US); Connor A. Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/606,377

(22) Filed: Mar. 15, 2024

(65) Prior Publication Data

US 2024/0220031 A1    Jul. 4, 2024

Related U.S. Application Data

(63) Continuation of application No. 17/362,457, filed on Jun. 29, 2021, now Pat. No. 11,947,733, which is a
(Continued)

(51) Int. Cl.
*G06F 3/03* (2006.01)
*G06T 13/20* (2011.01)
*G06T 19/00* (2011.01)

(52) U.S. Cl.
CPC ............... *G06F 3/03* (2013.01); *G06T 13/20* (2013.01); *G06T 19/006* (2013.01)

(58) Field of Classification Search
None
See application file for complete search history.

(56) References Cited

U.S. PATENT DOCUMENTS 8,310,521 B2 * 11/2012 Zhang ................. G11B 27/036
  709/201
10,043,066 B2 * 8/2018 Lawrence .............. H04N 7/147
(Continued)

FOREIGN PATENT DOCUMENTS

CN      101424984 A      5/2009
CN      105190485 A     12/2015
(Continued)

OTHER PUBLICATIONS

Applicant-Initiated Interview Summary received for U.S. Appl. No. 17/362,457, mailed on Aug. 18, 2023, 4 pages.
(Continued)

*Primary Examiner* — Kenneth Bukowski
(74) *Attorney, Agent, or Firm* — DLA Piper LLP (US)

(57) ABSTRACT

Techniques for displaying a virtual object in an enhanced reality setting in accordance with a physical muting mode being active are described. In some examples, while the physical muting mode is active, a system obtains a first set of context data for one or more physical elements in a physical setting and causes display of a virtual object representing the one or more physical elements in a first position using at least a portion of the first set of context data. After the virtual object representing the one or more physical elements is displayed in the first position, the physical muting mode is deactivated. In response to detecting the deactivation of the physical muting mode, the system causes display of a transitional motion of the virtual object representing the one or more physical elements from the first position to a second position.

16 Claims, 7 Drawing Sheets

Related U.S. Application Data continuation of application No. PCT/US2020/027501, filed on Apr. 9, 2020.

(60) Provisional application No. 62/834,266, filed on Apr. 15, 2019.

(56) References Cited

U.S. PATENT DOCUMENTS

| | | | |
|---|---|---|---|
| 10,834,456 B2* | 11/2020 | Rakshit | H04N 7/141 |
| 11,372,473 B2* | 6/2022 | Shimizu | B25J 5/00 |
| 2008/0136895 A1* | 6/2008 | Mareachen | H04N 7/147 348/14.03 |
| 2009/0079816 A1* | 3/2009 | Qvarfordt | G06V 40/20 348/14.16 |
| 2011/0007079 A1* | 1/2011 | Perez | A63F 13/56 345/473 |
| 2011/0298827 A1 | 12/2011 | Perez | |
| 2014/0320389 A1 | 10/2014 | Scavezze et al. | |
| 2015/0301596 A1 | 10/2015 | Qian et al. | |
| 2015/0381938 A1* | 12/2015 | Cunico | G06V 40/16 348/14.1 |
| 2016/0093113 A1 | 3/2016 | Liu et al. | |
| 2016/0134840 A1 | 5/2016 | Mcculloch | |
| 2016/0217616 A1 | 7/2016 | Kraver | |
| 2016/0300388 A1* | 10/2016 | Stafford | A63F 13/69 |
| 2017/0069134 A1 | 3/2017 | Shapira et al. | |
| 2017/0326457 A1 | 11/2017 | Tilton et al. | |
| 2018/0120928 A1* | 5/2018 | Hayashida | G06F 3/011 |
| 2020/0134298 A1* | 4/2020 | Zavesky | A63F 13/33 |
| 2020/0314483 A1* | 10/2020 | Rakshit | H04N 21/4318 |
| 2021/0325974 A1 | 10/2021 | Boissière et al. | |
| 2022/0083126 A1* | 3/2022 | Iwaki | G06F 3/0346 |

FOREIGN PATENT DOCUMENTS

| | | |
|---|---|---|
| CN | 107850936 A | 3/2018 |
| CN | 108027653 A | 5/2018 |
| EP | 0583060 A2 | 2/1994 |

OTHER PUBLICATIONS

Applicant-Initiated Interview Summary received for U.S. Appl. No. 17/362,457, mailed on Dec. 12, 2023, 4 pages.

Final Office Action received for U.S. Appl. No. 17/362,457, mailed on Oct. 12, 2023, 18 pages.

International Preliminary Report on Patentability received for PCT Patent Application No. PCT/US2020/027501, mailed on Oct. 28, 2021, 9 pages.

International Search Report and Written Opinion received for PCT Patent Application No. PCT/US2020/027501, mailed on Jun. 30, 2020, 10 pages.

Non-Final Office Action received for U.S. Appl. No. 17/362,457, mailed on Jul. 12, 2023, 14 pages.

Notice of Allowance received for U.S. Appl. No. 17/362,457, mailed on Jan. 10, 2024, 8 pages.

Notice of Allowance received for Chinese Patent Application No. 202080027010.8, mailed on Jul. 8, 2024, 5 pages (1 page of English Translation and 4 pages of Official Copy).

Office Action received for Chinese Patent Application No. 202080027010.8, mailed on Mar. 6, 2024, 14 pages (6 pages of English Translation and 8 pages of Official Copy).

\* cited by examiner

MUTING MODE FOR A VIRTUAL OBJECT REPRESENTING ONE OR MORE PHYSICAL ELEMENTS

CROSS-REFERENCE TO RELATED APPLICATIONS

This application is a continuation U.S. patent application Ser. No. 17/362,457, entitled "MUTING MODE FOR A VIRTUAL OBJECT REPRESENTING ONE OR MORE PHYSICAL ELEMENTS," filed Jun. 29, 2021, which is a continuation of PCT No. PCT/US2020/27501, entitled "ATTENUATING MODE," filed Apr. 9, 2020, which claims priority to U.S. Provisional Patent Application No. 62/834,266, entitled "ATTENUATING MODE IN A SIMULATED REALITY SETTING," filed Apr. 15, 2019, which are incorporated by reference herein in their entireties.

TECHNICAL FIELD

The present disclosure relates generally to enhanced reality settings, and more specifically to techniques for attenuating correspondence between a virtual object in an enhanced reality setting and a physical object.

BACKGROUND

In an enhanced reality setting, the movements of a user may be reproduced by a virtual object that is based on the user. However, the virtual object may reproduce movements that the user does not wish to be reproduced in the enhanced reality setting.

SUMMARY

Described herein are techniques for displaying a virtual object in an enhanced reality setting in accordance with an attenuating mode (e.g., physical muting mode) being active. With these techniques, a user can perform an action without that action being reproduced by a virtual object that is based on the user.

In some embodiments, a method is described. The method comprises: obtaining context data for one or more physical elements in a physical setting, wherein the context data includes first context data and second context data that is different from the first context data; and in response to obtaining the context data for the one or more physical elements in the physical setting: in accordance with a determination that an attenuation (e.g., physical muting) mode is active, causing display of a virtual object that represents the one or more physical elements using the first context data without using the second context data.

In some embodiments, a non-transitory computer-readable storage medium is described. The non-transitory computer-readable storage medium stores one or more programs configured to be executed by one or more processors, the one or more programs including instructions for: obtaining context data for one or more physical elements in a physical setting, wherein the context data includes first context data and second context data that is different from the first context data; and in response to obtaining the context data for the one or more physical elements in the physical setting: in accordance with a determination that a physical muting mode is active, causing display of a virtual object that represents the one or more physical elements using the first context data without using the second context data.

In some embodiments, a transitory computer-readable storage medium is described. The transitory computer-readable storage medium stores one or more programs configured to be executed by one or more processors, the one or more programs including instructions for: obtaining context data for one or more physical elements in a physical setting, wherein the context data includes first context data and second context data that is different from the first context data; and in response to obtaining the context data for the one or more physical elements in the physical setting: in accordance with a determination that a physical muting mode is active, causing display of a virtual object that represents the one or more physical elements using the first context data without using the second context data.

In some embodiments, a system is described. The system comprises: one or more processors; and memory storing one or more programs configured to be executed by the one or more processors, the one or more programs including instructions for: obtaining context data for one or more physical elements in a physical setting, wherein the context data includes first context data and second context data that is different from the first context data; and in response to obtaining the context data for the one or more physical elements in the physical setting: in accordance with a determination that a physical muting mode is active, causing display of a virtual object that represents the one or more physical elements using the first context data without using the second context data.

In some embodiments, a system is described. The system comprises: means for obtaining context data for one or more physical elements in a physical setting, wherein the context data includes first context data and second context data that is different from the first context data; and means, in response to obtaining the context data for the one or more physical elements in the physical setting: in accordance with a determination that a physical muting mode is active, for causing display of a virtual object that represents the one or more physical elements using the first context data without using the second context data.

DESCRIPTION

Figure 1A:
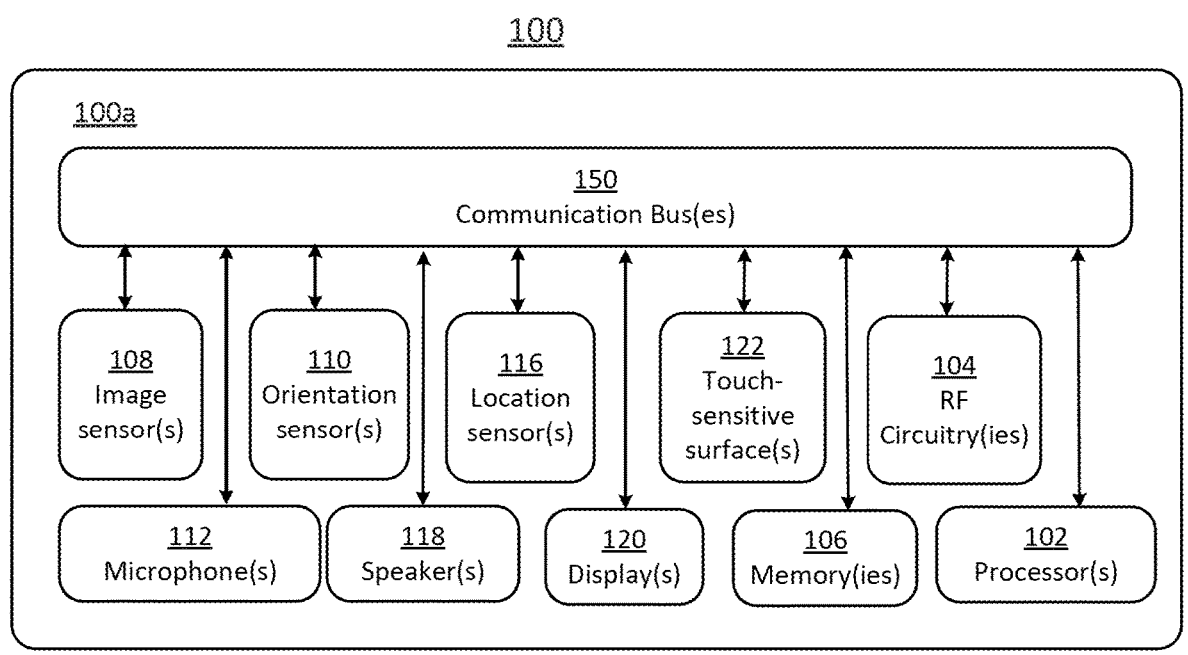
FIGS. 1A-1B depict exemplary systems for use in various computer enhanced reality technologies.

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figure 1B:
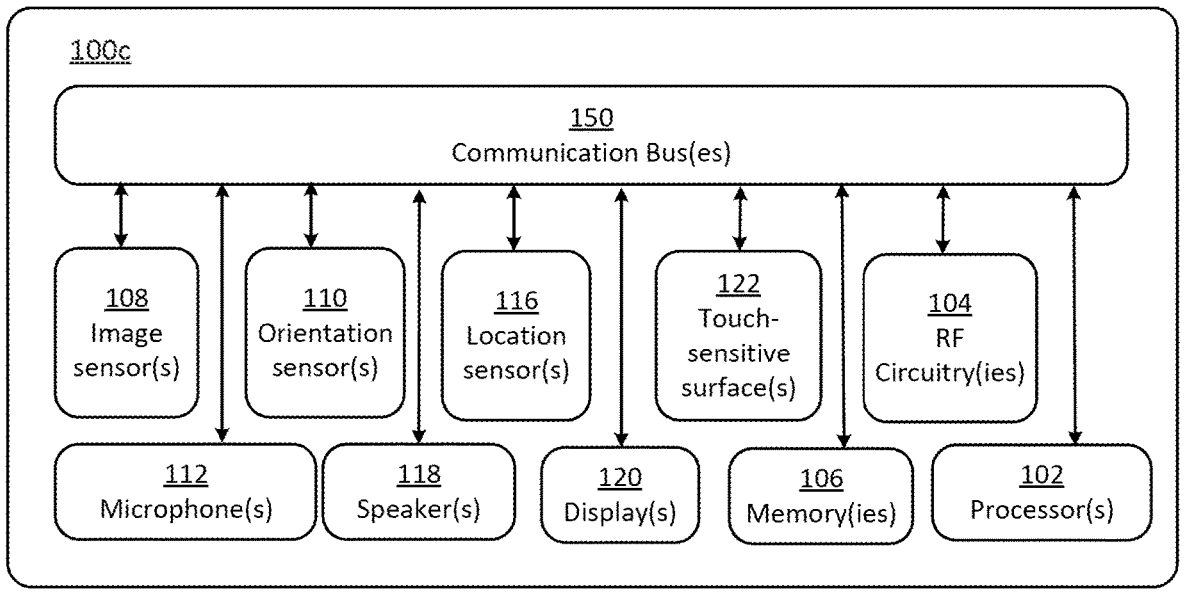
Figure 1B:
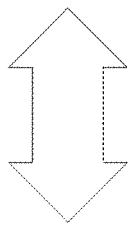
Figure 1B:
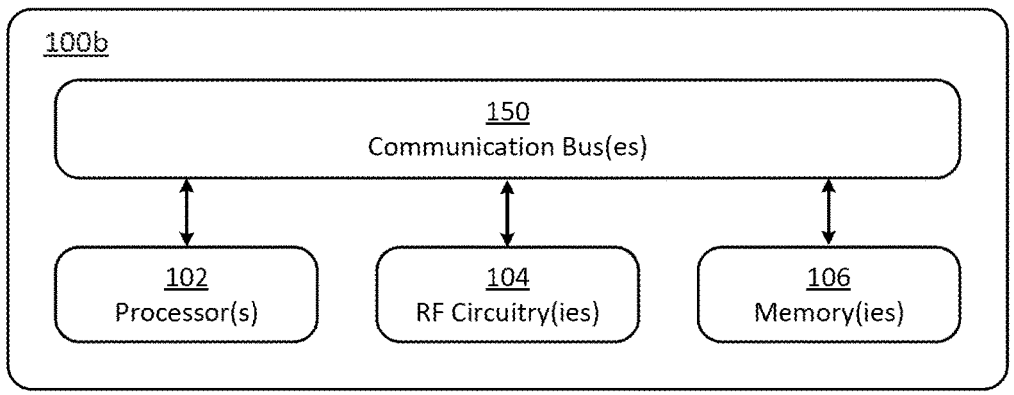

FIG. 1A and FIG. 1B depict exemplary system 100 for use in various enhanced reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2A:
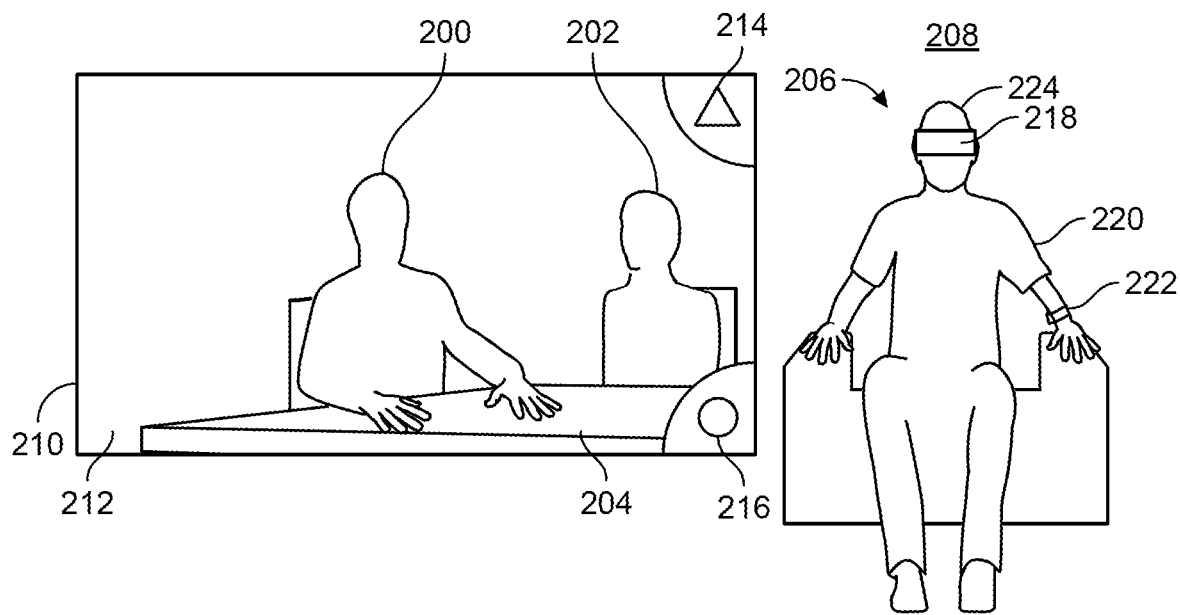
FIG. 2A illustrates an example of an enhanced reality setting, where a virtual object corresponds to a physical user.

In the example illustrated in FIG. 2A, two virtual avatars (200, 202) are attending a virtual meeting with a third virtual avatar (not shown) in an ER setting, depicted on the left side of FIG. 2A. FIG. 2A depicts the ER setting from the first-person perspective of the third virtual avatar, who is sitting at virtual table 204, along with virtual avatar 200 and virtual avatar 202. Each of the virtual avatars is an avatar for a respective physical user. For example, virtual avatar 200 is a virtual representation of physical user 206 in physical setting 208, depicted on the right side of FIG. 2A. As another example, virtual avatar 202 is a virtual representation of a second physical user (not shown). Similarly, the third virtual avatar is a virtual representation of a third physical user (not shown).

With reference to FIGS. 2A-2G, the first-person perspective of the third virtual avatar is provided in order to illustrate how the movements or poses of virtual avatar 200 are portrayed to the third physical user. For example, the third physical user views the movements or poses of virtual avatar 200 via display 210, which is a part of a system (e.g., 100) operated by the third physical user. Accordingly, if virtual avatar 200 reproduces some movement by physical user 206, the third physical user would see the reproduced movement via display 210. Moreover, as further discussed below, user interface 212, on display 210, includes physical muting icon 214 and absence icon 216.

At FIG. 2A, physical user 206 may be wearing an HMD device (not shown) (e.g., device 100a). In some embodiments, sensor(s) of system 100 capture data (e.g., context data) representing any movement or poses of physical user 206. In some embodiments, the sensor(s) include image sensor(s) 108, orientation sensor(s) 110, location sensor(s) 116, or any combination thereof. For example, sensor(s) in inward-facing camera(s) capture arm, body, head, and/or facial (e.g., eye) movements. As another example, inward-facing camera(s) capture facial expressions and/or one or more poses of the physical user's arms, body, and/or head. In some embodiments, the inward-facing camera(s) are facing physical user 206, and are optionally positioned at various locations around and/or nearby physical user 206. In some embodiments, sensor(s) in physical controllers held by physical user 206 capture data representing movement or a pose of his hand(s).

With reference to FIG. 2A, upon capturing data about physical user 206, system 100 causes display of virtual avatar 200 via display 210. System 100 causes display of virtual avatar 200 via a display (e.g., 210) of a different system. For example, system 100 causes display via a display of a different system by transmitting at least a portion of the captured data to the different system. In some embodiments, the captured data is configured to result in display of the virtual object at the different system based on at least the portion of the context data. As the sensor(s) capture data about physical user 206, system 100 causes display of virtual avatar 200 in accordance with the movement of physical user 206. As a result, the third physical user views the movements of physical user 206 via the movements of virtual avatar 200 being displayed on display 210. In some embodiments, system 100 causes this display of virtual avatar 200 based on a determination that a physical muting mode is not active. This physical muting mode is further discussed below with respect to FIG. 2C.

Figure 2B:
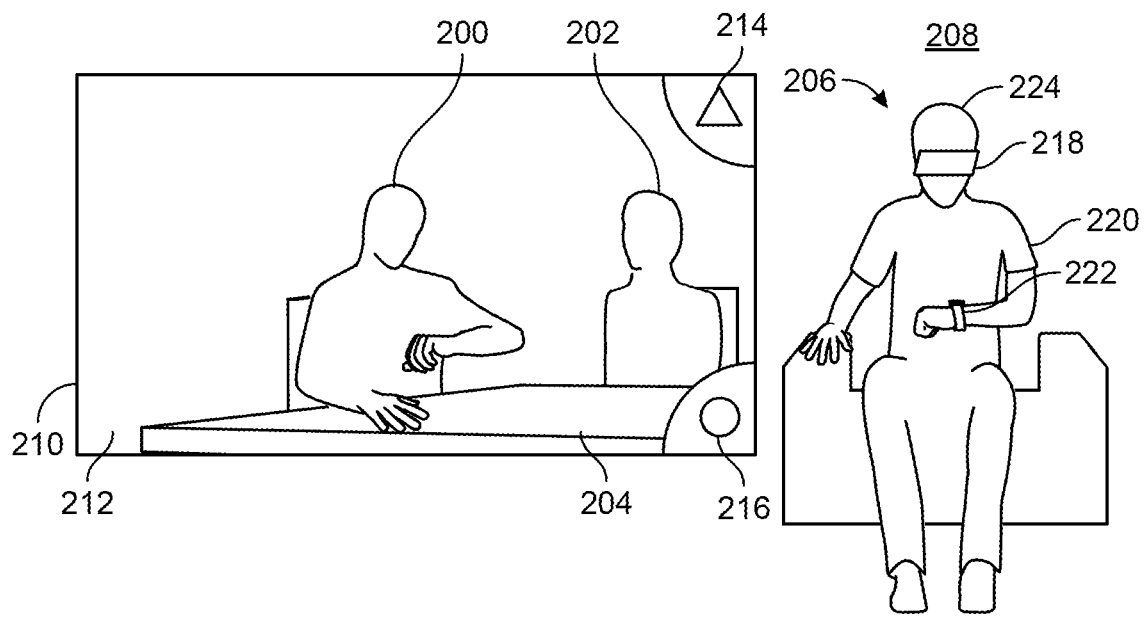
FIG. 2B illustrates an example of displaying a virtual object in accordance with a physical muting mode not being active.

FIG. 2B illustrates an example where virtual avatar 200 reproduces the movements of physical user 206 as the sensor(s) capture data about physical user 206. Referring back to FIG. 2A, suppose physical user 206 intends to check his watch located on arm 220. At FIG. 2B, physical user 206 raises arm 220 and looks at watch 222. While physical user 206 is moving his arm to check watch 222, system 100 captures data representing movement of physical user 206 using the sensor(s) discussed above. Further, while physical user 206 is moving, system 100 causes display of virtual avatar 200 using the captured data. That is, virtual avatar 200 is displayed in a manner that reproduces movements of physical user 206 in the physical setting 208.

As shown in FIG. 2B, the movements of physical user 206 have been reproduced by virtual avatar 200. Specifically, virtual avatar 200 raises its arm in the same manner as physical user 206. In some situations, however, such reproduction of movement may be undesirable by a user. A user (e.g., physical user 206) may for instance, seek to avoid other users seeing, via their respective systems, virtual avatar 200 raising its arm during the virtual meeting. In this manner, the user may avoid other users interpreting this action as, for example, a sign of boredom or a lack of consideration by the user. Accordingly, a technique is desired that allows physical user 206 to perform an action without virtual avatar 200 reproducing the movement associated with that action. This can also include habitual or involuntary actions that the user may not be contemporaneously aware of as they occur. Examples of user actions include, but are not limited to, sneezing, coughing, fidgeting, stretching, raising one's arm, eye twitching, itching, swallowing, and the like. These techniques can beneficially improve the privacy of a user who is participating in an ER setting with other participants.

Figure 2C:
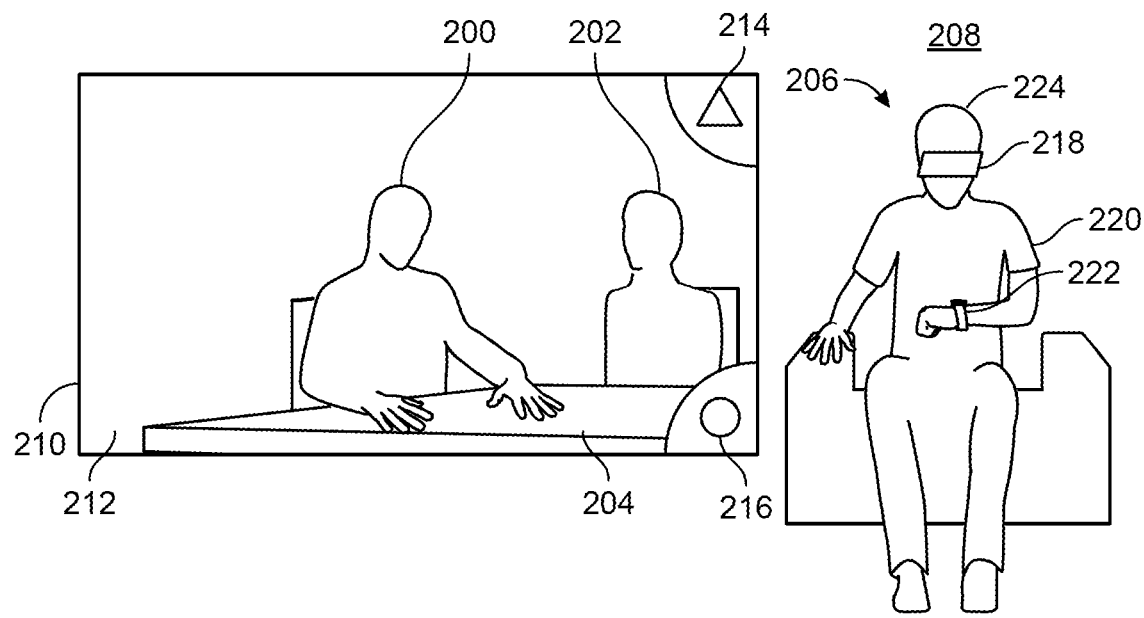
FIGS. 2C-2E illustrate an example of displaying a virtual object in accordance with a physical muting mode being active.

FIG. 2C illustrates an example of the technique described above. With further reference to FIG. 2A, consider the example where physical user 206 intends to check his watch. In some examples, prior to checking his watch, physical user 206 may enable a physical muting mode. That is, system 100 detects activation of a physical muting mode prior to capturing data about physical user 206 (e.g., checking his watch). Upon detecting activation of the physical muting mode, system 100 activates the physical muting mode. As a result, despite physical user 206 having moved his arm, virtual avatar 200 does not reproduce this movement due to the physical muting move being active. In some examples, the arm of virtual avatar 200 does not move at all. Notably, this is in contrast to the previous example in FIG. 2B, where the physical muting mode is not active, and virtual avatar 200 does reproduce the movement associated with physical user 206 checking his watch.

In some embodiments, detecting activation of the physical muting mode includes detecting activation of a hardware button of system 100 (e.g., a button on a physical controller). In some embodiments, detecting activation of the physical muting mode includes detecting a user's gaze being directed at a predetermined location (e.g., physical muting icon 214 on user interface 212) for at least a threshold amount of time. For example, system 100 displays a user interface that is the same or similar to user interface 212. The user interface optionally includes one or more of the same user interface elements (e.g., 214, 216) as user interface 212. To activate the physical muting mode, physical user 206 looks at an icon indicative of a physical muting mode for at least a threshold amount of time. For example, physical user 206 looks at the upper-right corner of the user interface for at least a threshold amount of time, where the user interface displays a physical muting icon (e.g., 214). As a result, system 100 determines that the gaze of physical user 206 has been directed at the physical muting icon for at least a threshold amount of time. Upon this determination, system 100 activates the physical muting mode.

Due to the physical muting mode being active, virtual avatar 200 reproduces some movements of physical user 206. By way of example, virtual avatar 200 may reproduce movements of a first type (e.g., head movement), but not movements of a second type (e.g., user looking at watch). As depicted in FIG. 2C, for instance, physical user 206 raises his arm and looks at watch 222. While physical user 206 is moving his arm to check watch 222, system 100 captures data about physical user 206 using the sensor(s) discussed above. In some embodiments, the captured data includes arm data that represents movement or poses of arm 220, and head data that represents movement or poses of head 224. The captured data can also include data representing movements of other features of physical user 206, such as facial movements (e.g., eye) and/or body movements. In some embodiments, the arm data represents movement of only one arm (e.g., 220), while in other embodiments, the arm data represents movement of both arms.

In some embodiments, system 100 causes display of a virtual avatar using only a portion of captured data. For example, upon capturing data about physical user 206, system 100 causes display of virtual avatar 200 using the captured data. Since the physical muting mode is active, system 100 causes display of virtual avatar 200 using a portion of the captured data without using an excluded portion of the captured data. In the described example, for instance, the excluded portion of the captured data is the arm data representing movement of the arm of physical user 206. As shown in FIG. 2C, system 100 causes display of virtual avatar 200 using the head data without using the arm data. As a result, even though physical user 206 is checking watch 222, virtual avatar 200 does not reproduce the raising of the arm, or in some examples, movement of head 224. Thus, other physical users viewing virtual avatar 200 are not aware of physical user 206 checking watch 222.

As discussed above with reference to FIG. 2C, if a physical muting mode is active (e.g., enabled), system 100 causes display of virtual avatar 200 using a portion of the captured data without using an excluded (or excluded) portion of the captured data. In contrast, as shown in FIG. 2B, if the physical muting mode is not active (e.g., not enabled, disabled), system 100 causes display of virtual avatar 200 using the portion of the captured data while also using the portion that would otherwise be excluded while the physical muting mode is active in FIG. 2C. Accordingly, virtual avatar 200 in FIG. 2B does reproduce the raising of arm 220 associated with physical user 206 checking watch 222, while in FIG. 2C, virtual avatar 200 does not reproduce the raising of arm 220. In some embodiments, virtual avatar 200 still reproduces the movement or a pose of head 224 in FIGS. 2B-2C, as the head data is not excluded when causing display of virtual avatar 200. However, in other embodiments, the head data is excluded such that the movement or poses of head 224 are not reproduced by virtual avatar 200.

In some embodiments, upon capturing data about physical user 206, system 100 identifies a portion of the captured data to be excluded. For example, with reference to FIG. 2C, system 100 identifies the data that represents movement or poses of arm 220 as the excluded portion. In some embodiments, system 100 identifies the excluded portion in accordance with user selection (e.g., via voice or user interface). For example, system 100 displays a user interface with selectable options (e.g., arm, head, eyes). When a user selects a selectable option, system 100 identifies the excluded portion based on the selected option. In some embodiments, system 100 automatically identifies the excluded portion based on a match, e.g., within a threshold, between the captured data and stored data. For example, the stored data includes data representing certain user movements that are not to be reproduced (e.g., raise arm to fix hair, raise arm to check watch, eye twitching). In some embodiments, a user generates the stored data by training the system with movements that the user does not wish to be reproduced.

Figure 2D:
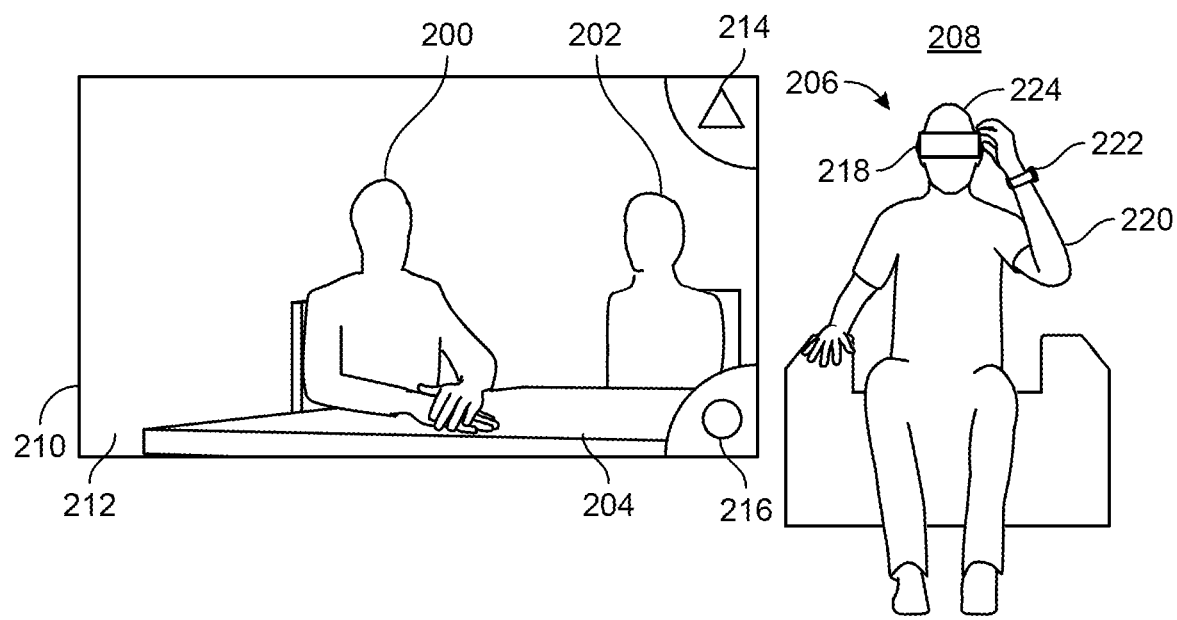

FIG. 2D illustrates an additional example where virtual avatar 200 reproduces some movements of physical user 206. As described below, system 100 causes virtual avatar 200 to reproduce some, but not all, movements of physical user 206 due to the physical muting mode being active. As shown, physical user 206 transitions from checking watch 222 to fixing his hair. During this transition, system 100 continues to capture data about physical user 206. Similar to the example described with respect to FIG. 2C, upon capturing data about physical user 206, system 100 causes display of virtual avatar 200 using a portion of the captured data without using an excluded portion of the captured data. In particular, due to the physical muting mode being active, system 100 causes display of virtual avatar 200 using head data without using arm data. As a result, even though physical user 206 is fixing his hair with arm 220, virtual avatar 200 does not reproduce the movement or pose associated with arm 220. Thus, other physical users are not aware of physical user 206 fixing his hair. In some embodiments, system 100 causes this display of virtual avatar 200 based on a determination that the physical muting mode is active.

In some embodiments, system 100 causes display of virtual avatar 200 in a manner in which the movements of virtual avatar 200 do not necessarily correspond to movements of the user. As an example, FIGS. 2C-2D depict virtual avatar 200 performing some movements with its arms that do not correspond to the movements of arm 220. In particular, upon capturing data about physical user 206, system 100 causes display of an idle animation. In some embodiments, system 100 causes this display of the idle animation based on a determination that the physical muting mode is active. Here, the idle animation corresponds to a portion of virtual avatar 200 (e.g., the arms).

As depicted in FIGS. 2C-2D, the idle animation involves moving the arms to a position where the hands overlap in a natural manner, which further supports the illusion that physical user 206 is not checking his watch or fixing his hair. In some embodiments, the idle animation can be adjusted for each user. For example, a user can select from a displayed list of predetermined idle animations that the system can use in the physical muting mode. As an example, instead of the idle animation in FIGS. 2C-2D, system 100 optionally causes display of an idle animation where virtual avatar 200 crosses its arms. In some embodiments, the displayed list includes user-created idle animations based on earlier user input.

Figure 2E:
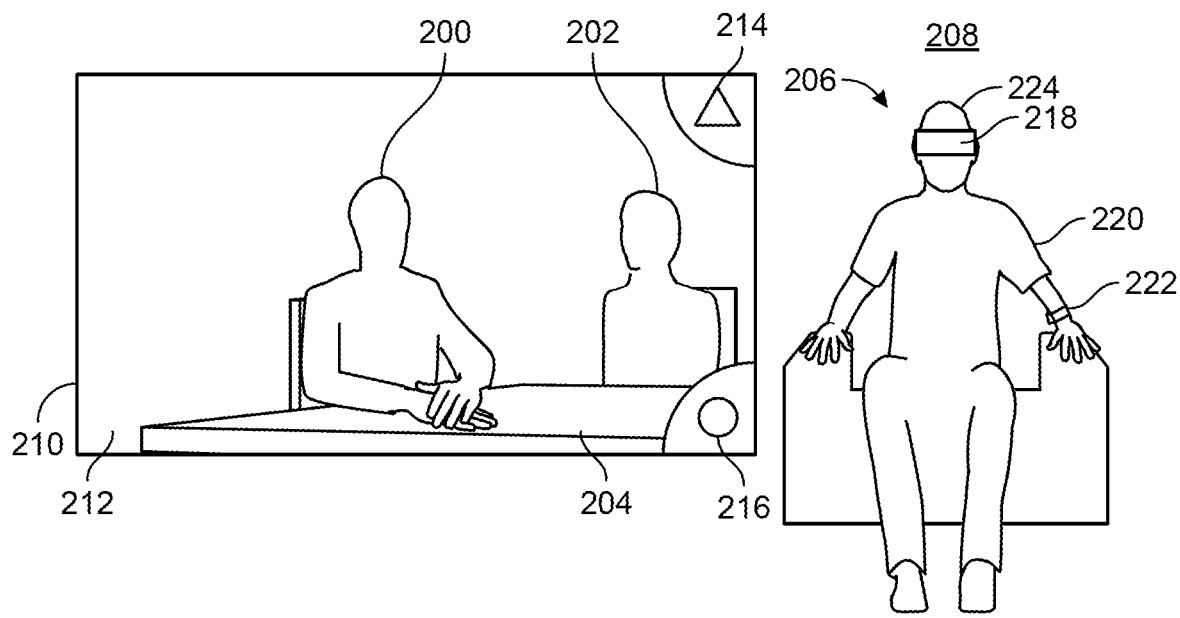

As shown in FIG. 2E, physical user 206 places his arms back at the resting position shown in FIG. 2A, while the physical muting mode is still active. Because the physical muting mode is still active, upon capturing data about physical user 206, system 100 continues to cause display of virtual avatar 200 without using an excluded portion of the captured data (e.g., arm data). Accordingly, as shown in the illustrated example, virtual avatar 200 is shown with hands placed on one another even though physical user 206 has his hands at his sides.

Figure 2F:
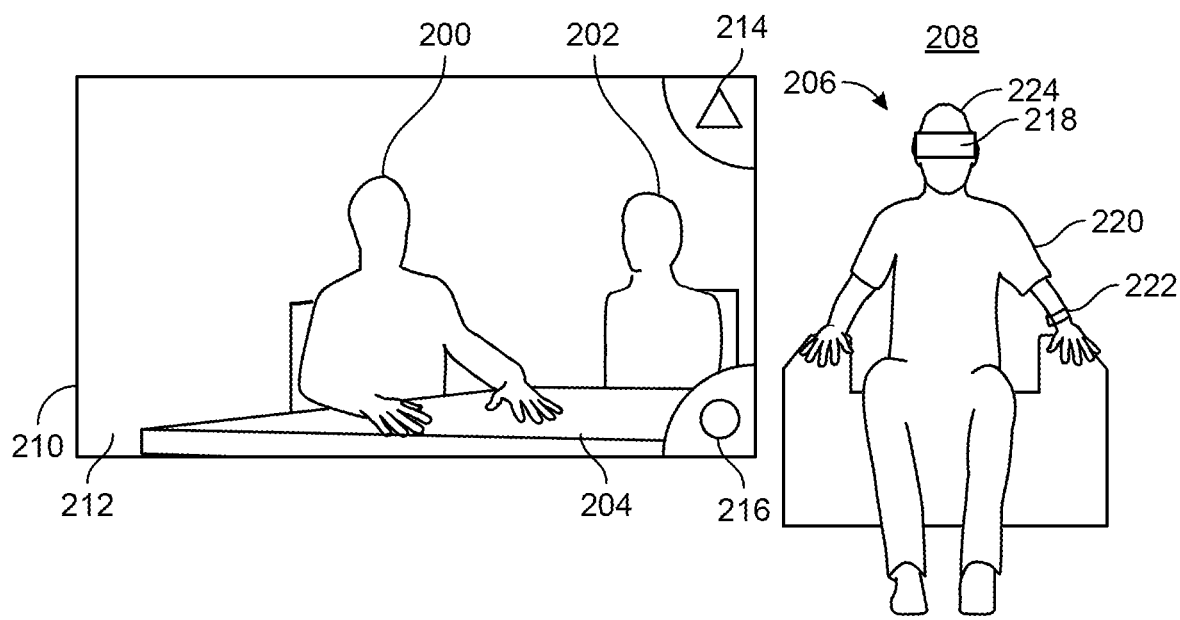
FIG. 2F illustrates an additional example of displaying a virtual object in accordance with a physical muting mode not being active.

With reference to FIG. 2F, physical user 206 deactivates the physical muting mode. As a result, upon capturing data about physical user 206, system 100 causes display of virtual avatar 200 using head data while also using the portion that would otherwise be excluded in FIG. 2E (e.g., the arm data). As a result, system 100 causes display of virtual avatar 200 with arms in the same pose as the arms of physical user 206. In some embodiments, in response to deactivation of the physical muting mode, system 100 causes display of a transitional motion for virtual avatar 200, where virtual avatar 200 moves from the muted position (e.g., arms crossed in FIG. 2E) to an unmuted position (e.g., arms apart in FIG. 2F). In some embodiments, in response to deactivation of the physical muting mode, system 100 causes display of the transitional motion in accordance with a determination that the captured data indicates the position of the virtual avatar (e.g., 200) does not correspond to (e.g., match) the position of the physical user (e.g., 206) represented by the virtual avatar.

In some embodiments, physical user 206 deactivates the physical muting mode in the same manner as activating the physical muting mode, as discussed above. For example, detecting activation of a hardware button or detecting that a user's gaze is directed at a predetermined location for a threshold amount of time can toggle a state of the physical muting mode from active to inactive, or vice-versa.

In some embodiments, physical user 206 can deactivate the physical muting mode by positioning himself in a particular pose. For example, physical user 206 deactivates the physical muting mode by placing his arms in a pose that matches the pose of his virtual avatar. In some embodiments, system 100 displays a user interface with a 3D visual representation (e.g., a ghost image) that mirrors the pose of the arms of virtual avatar 200 in FIG. 2E. To deactivate the physical muting mode, physical user 206 can position his arms in a pose that matches the pose of the 3D visual representation. Put another way, physical user 206 can deactivate the physical muting mode by moving his arms from his sides, as shown in FIG. 2E, to a pose that matches the pose of the arms of virtual avatar 200 (e.g., one hand placed over another). In some embodiments, system 100 captures data about physical user 206. In some embodiments, upon capturing data about physical user 206, system 100 determines that the pose of the arms of physical user 206 matches, e.g., within a threshold, the pose of the 3D visual representation. In some embodiments, upon this determination, system 100 deactivates the physical muting mode.

Figure 2G:
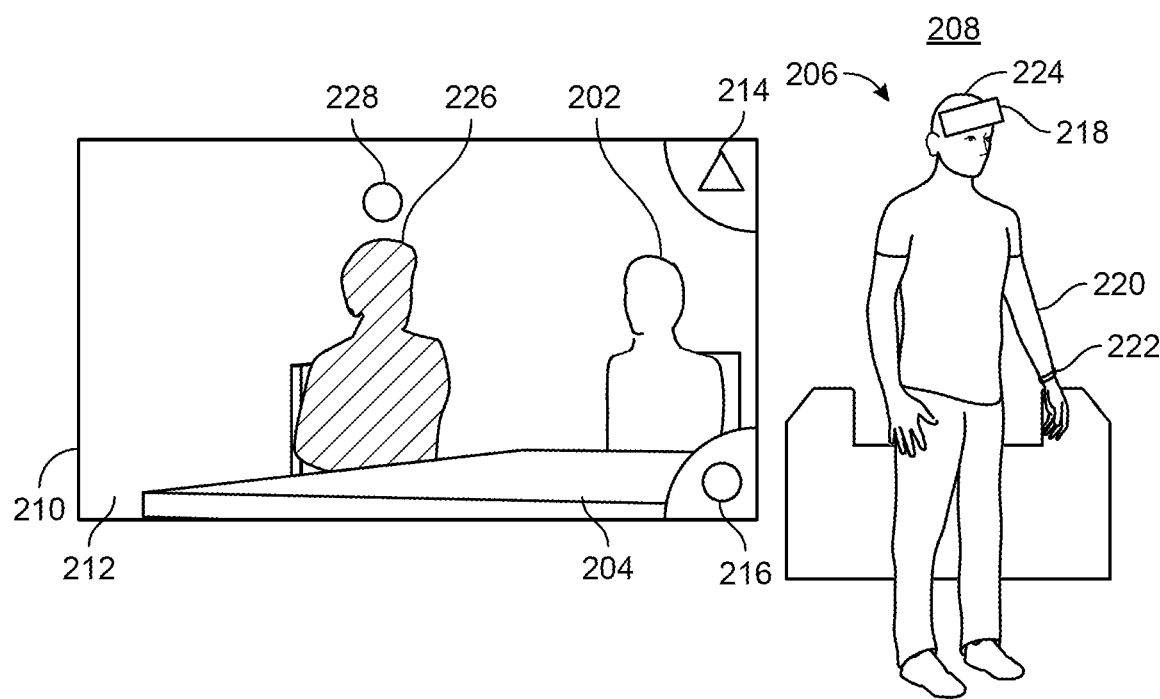
FIG. 2G illustrates an example of displaying a virtual object in accordance with an absence mode being active.

In some examples, physical user 206 may wish to temporarily leave the virtual meeting. As shown in FIG. 2G, for instance, upon leaving the meeting, physical user 206 can provide an indication of his temporary absence by enabling an absence mode. In some embodiments, physical user 206 activates the absence mode prior to rising out of his chair. In some embodiments, system 100 detects activation of the absence mode prior to capturing data about physical user 206. Upon detecting activation of the absence mode, system 100 activates the absence mode.

In some embodiments, absence mode can be activated or deactivated in the same manner as the physical muting mode, as discussed above. For example, detecting activation of absence mode can include detecting activation of a hardware button of system 100. As another example, detecting activation of absence mode can include detecting a user's gaze being directed at a predetermined location (e.g., absence icon 216) for at least a threshold amount of time.

Once absence mode has been activated, physical user 206 can rise out of his chair without virtual avatar 200 reproducing any subsequent movements or poses of physical user 206. In some embodiments, while the absence mode is enabled, system 100 continues to capture data about physical user 206. Upon capturing data about physical user 206, system 100 causes display of virtual avatar 200 without using the head data and without using the arm data. In some embodiments, system 100 causes display of virtual avatar 200 using none of the captured data. In some embodiments, while the absence mode is enabled, system 100 does not capture data about physical user 206. As shown in FIG. 2G, activating the absence mode causes display of a visual indication that the absence mode is active. In some embodiments, the visual indication includes stand-in avatar 226 and/or absence indicator 228.

Figure 3:
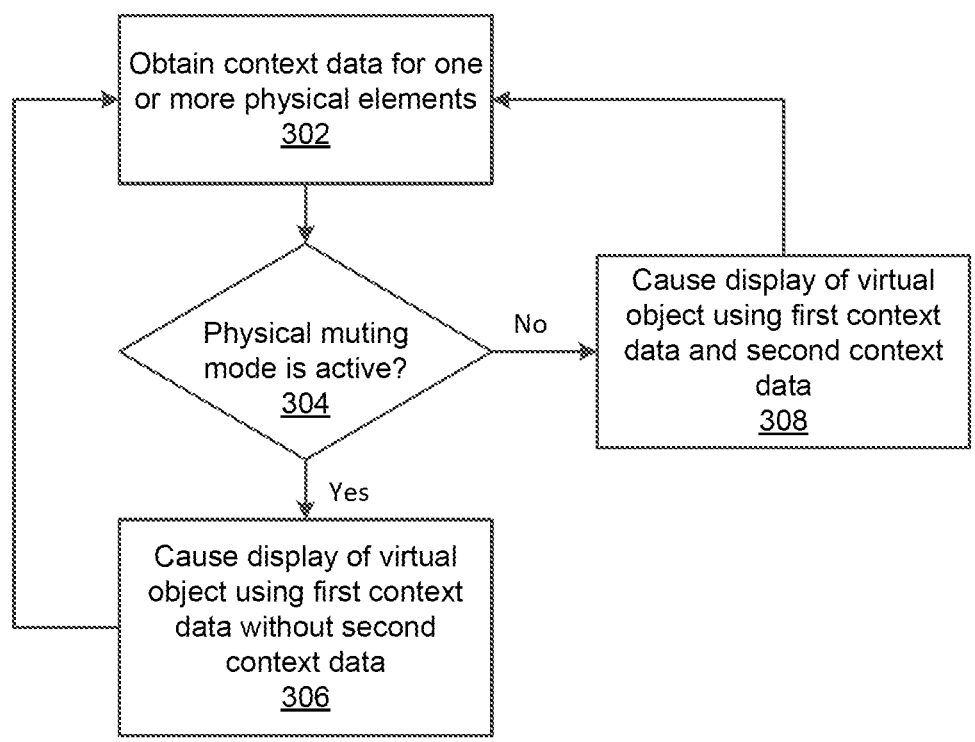
FIG. 3 is a flow diagram illustrating a method for displaying a virtual object based on whether a physical muting mode is active.

FIG. 3 is a flow diagram illustrating method 300 for displaying a virtual object based on whether a physical muting mode is active. In some embodiments, the method is performed by an HMD device (e.g., 100*a*). In some embodiments, the method is performed by a system (e.g., 100).

At block 302, a system (e.g., 100) obtains (e.g., captures) context data (e.g., data captured by the sensor(s) (e.g., 108, 110, 116), image data, voice data) for one or more physical elements (e.g., 206, 220, 222, 224) (e.g., user, person, body, face, head, hand, eyes, limb (e.g., arm, leg)) in a physical setting (e.g., 208), wherein the context data includes first context data and second context data that is different from the first context data. In some embodiments, the context data is obtained using image sensor(s) and microphone(s) located at the system or a device external to the system.

In some embodiments, the obtained context data (e.g., the first context data and/or the second context data) includes sensor data representing (e.g., corresponding to, based on) movement of the one or more physical elements (e.g., 206, 220, 222, 224) in the physical setting (e.g., 208). In some embodiments, the sensor data is captured using inward facing camera(s) that capture your eye movements (e.g., of physical user 206), as well inward facing camera(s) that capture your arm (e.g., 220) movement or body pose (e.g., of physical user 206).

In some embodiments, prior to obtaining the context data for the one or more physical elements (e.g., 206, 220, 222, 224) in the physical setting (e.g., 208): the system (e.g., 100) receives a request to enable the physical muting mode (e.g., activation of a user interface (UI) element (e.g., 214) (e.g., button) or hardware button (e.g., of system 100), user gesture, gaze directed at a predetermined location (e.g., 214) for longer than a threshold amount of time (e.g., 3, 5, or 7 seconds). In some embodiments, the hardware button is located at the system (e.g., 100) (e.g., on a physical controller). In some embodiments, the hardware button is located at a device that is external to the system.

In some embodiments, prior to obtaining the context data for the one or more physical elements (e.g., 206, 220, 222, 224) in the physical setting (e.g., 208): in response to receiving the request to activate the physical muting mode, the system (e.g., 100) enables the physical muting mode. In some embodiments, the request to activate the physical muting mode is a request to activate the physical muting mode for a portion of the one or more physical elements (e.g., a discrete body part).

At block 304, the system (e.g., 100) determines whether a physical muting mode is active. In some embodiments, instead of the system, a device external to the system (e.g., a server) determines whether the physical muting mode is active. In some embodiments, the system determines whether a physical muting mode is active upon capturing data about the physical user (e.g., 206).

At block 306, in response to obtaining the context data for the one or more physical elements (e.g., 206, 220, 222, 224) in the physical setting (e.g., 208): in accordance with a determination that a physical muting mode is active (e.g., enabled), the system (e.g., 100) causes display of a virtual object (e.g., avatar) (e.g., 200) that represents the one or more physical elements using the first context data without using the second context data (e.g., a portion of the context data to be excluded (e.g., ignored)). In some embodiments, causing the display of the virtual object includes transmitting the first context data without transmitting the second context data. In some embodiments, causing the display of the virtual object includes transmitting at least a portion of the context data, wherein the context data is configured to result in display of the virtual object based on at least the portion of the context data. After causing display of the virtual object, the system returns to block 302 to repeat the above-described techniques.

In some embodiments, the virtual object (e.g., 200) is a photorealistic representation of the one or more physical elements (e.g., 206, 220, 222, 224). In some embodiments, the virtual object is an abstract (e.g., nonrealistic, cartoonish, graphical) representation of the one or more physical elements. In some embodiments, the virtual object is displayed on a display (e.g., 210) of a different system. In some embodiments, the virtual object is displayed based on data transmitted by the system (e.g., 100), the transmitted data corresponding to the one or more physical elements. In some embodiments, causing display using the first context data without using the second context data includes forgoing transmitting the second context data. In some embodiments, the virtual object is displayed in an ER setting.

In some embodiments, causing display of the virtual object (e.g., 200) that represents the one or more physical elements (e.g., 206, 220, 222, 224) using the first context data without using the second context data includes identifying a portion of the obtained context data (e.g., portion corresponding to one or more physical elements or a portion thereof, portion of the context data to be excluded (e.g., ignored)) (e.g., determining which portion of the obtained context data is to be excluded). In some embodiments, the portion is identified based on user selection of a portion of the one or more physical elements. In some embodiments, the user selection occurs prior to obtaining the context data for the one or more physical elements. In some embodiments, the portion of the obtained context data is identified automatically based on a match (e.g., within a threshold) between the portion of the obtained context data and predefined user data (e.g., user data corresponding to user movements (e.g., by physical user 206)). In some embodiments, the user data is captured prior to obtaining context data for the one or more physical elements. In some embodiments, the portion of the obtained context data is identified automatically based on a match in response to obtaining the context data for the one or more physical elements. In some embodiments, the portion of the obtained context data is identified automatically regardless of whether the physical muting mode is active.

In some embodiments, causing display of the virtual object (e.g., 200) that represents the one or more physical elements (e.g., 206, 220, 222, 224) using the first context data without using the second context data includes causing display of the virtual object that represents the one or more physical elements without the identified portion of the obtained context data (e.g., portion corresponding to one or more physical elements or a portion thereof, portion of the context data to be excluded (e.g., ignored)). In some embodiments, the identified portion corresponds to (e.g., is, includes) the second context data. In some embodiments, the identified portion of the obtained context data corresponds to a portion of the one or more physical elements (e.g., hand, arm, eyes). In some embodiments, causing display of the virtual object (e.g., 200) that represents the one or more physical elements (e.g., 206, 220, 222, 224) using the first context data and the second context data includes forgoing identifying the portion of the obtained context data (e.g., the context data to be excluded (e.g., ignored)). In some embodiments, causing display of the virtual object that represents the one or more physical elements using the first context data and the second context data includes forgoing determining which portion of the obtained context data is to be excluded.

In some embodiments, causing display of the virtual object (e.g., 200) that represents the one or more physical elements (e.g., 206, 220, 222, 224) using the first context data without using the second context data includes causing display of a predetermined animation (e.g., predetermined idle animation) (e.g., corresponding to the hands of virtual avatar 200 in FIGS. 2C-2D). In some embodiments, the predetermined animation corresponds to a portion of the one or more physical elements (e.g., the same portion that corresponds to the identified portion of the obtained context data (e.g., the second context data, the excluded (e.g., ignored) portion)). In some embodiments, causing display of the virtual object that represents the one or more physical elements using the first context data and the second context data includes forgoing causing display of the predetermined animation. In some embodiments, the predetermined animation is displayed concurrently with the virtual object that represents the one or more physical elements. In some embodiments, the predetermined animation corresponds to (e.g., forms) a portion of the virtual object that represents the one or more physical elements. In some embodiments, the predetermined animation does not correspond to (e.g., is not based on) the obtained context data (e.g., movement or pose) of the one or more physical elements.

At block 308, in response to obtaining the context data for the one or more physical elements (e.g., 206, 220, 222, 224) in the physical setting (e.g., 208): in accordance with a determination that the physical muting mode is not active (e.g., not enabled), the system (e.g., 100) causes display of the virtual object (e.g., 200) that represents the one or more physical elements using the first context data and the second context data (e.g., a portion of the context data to be excluded (e.g., ignored)). After causing display of the virtual object, the system returns to block 302 to repeat the above-described techniques.

In some embodiments, in response to obtaining the context data for the one or more physical elements (e.g., 206, 220, 222, 224) in the physical setting (e.g., 208): in accordance with a determination that an absence mode is active, the system (e.g., 100) causes display of the virtual object (e.g., 200) that represents the one or more physical elements without using the first context data and the second context data. In some embodiments, the absence mode is different from the physical muting mode. In some embodiments, causing display of the virtual object that represents the one or more physical elements without using the first context data and the second context data includes causing display of a visual indication that the absence mode is active (e.g., 226, 228) (e.g., visual object (e.g., 226) is monochromatic, or visual indication (e.g., 228) is a UI element or graphical/ visual indication). In some embodiments, causing display of the virtual object that represents the one or more physical elements without using the first context data and the second context data includes causing display of a predetermined animation. In some embodiments, a visual indication is used in combination with (e.g., displayed concurrently with) the display of the predetermined animation. In some embodiments, the system (e.g., 100) determines whether an absence mode is active. In some embodiments, a device external to the system (e.g., a server) determines whether the absence mode is active. In some embodiments, the system determines whether an absence mode is active upon capturing data about the physical user.

What is claimed is:

1. An electronic system, comprising:
    one or more processors; and
    memory storing one or more programs configured to be executed by the one or more processors, the one or more programs including instructions for:
        while a physical muting mode is activated:
            obtaining a first set of context data for one or more physical elements in a physical setting;
            causing display of a virtual object representing the one or more physical elements in a first position using at least a portion of the first set of context data, wherein causing display of the virtual object in the first position includes posing a feature of a virtual avatar in a respective pose;
            after causing display of the virtual object representing the one or more physical elements in the first position, obtaining a second set of context data for the one or more physical elements in the physical setting; and
            determining that the second set of context data for the one or more physical elements in the physical setting corresponds to the respective pose of the feature of the virtual avatar; and
        in response to determining that the second set of context data for the one or more physical elements in the physical setting corresponds to the respective pose of the feature of the virtual avatar:
            deactivating the physical muting mode; and
            causing display of a transitional motion of the virtual object representing the one or more physical elements from the first position to a second position that is different from the first position.

2. The electronic system of claim 1, wherein the one or more programs further include instructions for:
    obtaining a second set of context data for the one or more physical elements in the physical setting, wherein causing the display of the transitional motion of the virtual object representing the one or more physical elements from the first position to the second position uses the second set of context data for the one or more physical elements in the physical setting.

3. The electronic system of claim 1, wherein the first position of the virtual object representing the one or more physical elements corresponds to a physical position of at least a portion of the one or more physical elements in the physical setting while the physical muting mode is activated, and wherein the second position of the virtual object representing the one or more physical elements corresponds to a physical position of the one or more physical elements in the physical setting upon deactivation of the physical muting mode.

4. The electronic system of claim 1, wherein the obtained first set of context data includes sensor data representing movement of the one or more physical elements in the physical setting.

5. The electronic system of claim 1, wherein the first set of context data includes first context data and second context data that is different from the first context data, and wherein causing display of the virtual object representing the one or more physical elements in the first position uses the first context data without using the second context data.

6. The electronic system of claim 1, wherein causing display of the virtual object representing the one or more physical elements in the first position using at least a portion of the first set of context data includes:
    identifying a respective portion of the obtained first set of context data; and
    causing display of the virtual object that represents the one or more physical elements without using the respective portion of the obtained first set of context data.

7. The electronic system of claim 6, wherein the respective portion of the obtained first set of context data is identified based on a match between the respective portion of the obtained first set of context data and predefined user data.

8. A non-transitory computer-readable storage medium storing one or more programs configured to be executed by one or more processors of an electronic system, the one or more programs including instructions for:
    while a physical muting mode is activated:
        obtaining a first set of context data for one or more physical elements in a physical setting;
        causing display of a virtual object representing the one or more physical elements in a first position using at least a portion of the first set of context data, wherein causing display of the virtual object in the first position includes posing a feature of a virtual avatar in a respective pose;
        after causing display of the virtual object representing the one or more physical elements in the first position, obtaining a second set of context data for the one or more physical elements in the physical setting; and
        determining that the second set of context data for the one or more physical elements in the physical setting corresponds to the respective pose of the feature of the virtual avatar; and
    in response to determining that the second set of context data for the one or more physical elements in the physical setting corresponds to the respective pose of the feature of the virtual avatar:
        deactivating the physical muting mode; and
        causing display of a transitional motion of the virtual object representing the one or more physical elements from the first position to a second position that is different from the first position.

9. The non-transitory computer-readable storage medium of claim 8, wherein the one or more programs further include instructions for:
    obtaining a second set of context data for the one or more physical elements in the physical setting, wherein causing the display of the transitional motion of the virtual object representing the one or more physical elements from the first position to the second position uses the second set of context data for the one or more physical elements in the physical setting.

10. The non-transitory computer-readable storage medium of claim 8, wherein the first position of the virtual object representing the one or more physical elements corresponds to a physical position of at least a portion of the one or more physical elements in the physical setting while the physical muting mode is activated, and wherein the second position of the virtual object representing the one or more physical elements corresponds to a physical position of the one or more physical elements in the physical setting upon deactivation of the physical muting mode.

11. The non-transitory computer-readable storage medium of claim 8, wherein the first set of context data includes first context data and second context data that is different from the first context data, and wherein causing display of the virtual object representing the one or more physical elements in the first position uses the first context data without using the second context data.

12. The non-transitory computer-readable storage medium of claim 8, wherein causing display of the virtual object representing the one or more physical elements in the first position using at least a portion of the first set of context data includes:
  identifying a respective portion of the obtained first set of context data; and
  causing display of the virtual object that represents the one or more physical elements without using the respective portion of the obtained first set of context data.

13. A method, comprising:
  at an electronic system:
    while a physical muting mode is activated:
      obtaining a first set of context data for one or more physical elements in a physical setting;
      causing display of a virtual object representing the one or more physical elements in a first position using at least a portion of the first set of context data, wherein causing display of the virtual object in the first position includes posing a feature of a virtual avatar in a respective pose;
      after causing display of the virtual object representing the one or more physical elements in the first position, obtaining a second set of context data for the one or more physical elements in the physical setting; and
      determining that the second set of context data for the one or more physical elements in the physical setting corresponds to the respective pose of the feature of the virtual avatar; and
    in response to determining that the second set of context data for the one or more physical elements in the physical setting corresponds to the respective pose of the feature of the virtual avatar:
      deactivating the physical muting mode; and
      causing display of a transitional motion of the virtual object representing the one or more physical elements from the first position to a second position that is different from the first position.

14. The method of claim 13, further comprising:
  obtaining a second set of context data for the one or more physical elements in the physical setting, wherein causing the display of the transitional motion of the virtual object representing the one or more physical elements from the first position to the second position uses the second set of context data for the one or more physical elements in the physical setting.

15. The method of claim 13, wherein the first position of the virtual object representing the one or more physical elements corresponds to a physical position of at least a portion of the one or more physical elements in the physical setting while the physical muting mode is activated, and wherein the second position of the virtual object representing the one or more physical elements corresponds to a physical position of the one or more physical elements in the physical setting upon deactivation of the physical muting mode.

16. The method of claim 13, wherein the first set of context data includes first context data and second context data that is different from the first context data, and wherein causing display of the virtual object representing the one or more physical elements in the first position uses the first context data without using the second context data.

* * * * *